Jan. 23, 1968  K. GROSSFIELD  3,365,012
TRACTION DEVICES

Filed Sept. 23, 1966  8 Sheets-Sheet 1

Jan. 23, 1968 K. GROSSFIELD 3,365,012
TRACTION DEVICES

Filed Sept. 23, 1966 8 Sheets-Sheet 6

United States Patent Office 3,365,012
Patented Jan. 23, 1968

3,365,012
TRACTION DEVICES
Karl Grossfield, 125 Greenhill, Prince Arthur Road,
London NW. 3, England
Continuation-in-part of application Ser. No. 382,507,
July 14, 1964. This application Sept. 23, 1966, Ser.
No. 581,629
Claims priority, application Great Britain, July 16, 1963,
28,100/63; Sept. 11, 1963, 35,802/63; Nov. 13, 1963,
44,723/63; Sept. 27, 1965, 41,027/65; Nov. 18, 1965,
49,012/65; Mar. 16, 1966, 11,420/66; Apr. 14, 1966,
16,364/66
12 Claims. (Cl. 180—4)

This application is a continuation-in-part of my copending patent application Serial No. 382,507, filed July 14, 1964, and now abandoned.

This invention relates to traction devices for vehicles. Traction devices normally used for vehicles comprise suitably tyred wheels. However, these have a low area of contact with the ground. Under certain circumstances, for example, when travelling over snow-covered or muddy ground, this low area of contact will be a severe disadvantage as the wheels will slip on the ground. Alternative traction means comprise a continuous track as often used in tractors, tanks and bulldozers. However, such continuous tracks are expensive to manufacture and maintain and usually have a short useful life. Also the tracks are normally very heavy.

An object of this invention is to provide a vehicle having traction means having a large area of contact with the ground but which is light to move and economical to produce.

Another object of this invention is to provide a vehicle in which the traction means comprise at least one ski or the like having a high resistance to movement in one direction and a low resistance to movement in the opposite direction.

Yet another object of this invention is to provide a vehicle in which when a force is applied to the ski in the said one direction a downward force is also applied to the ski.

Further and other objects of the invention will be apparent from the following description of a number of embodiments of the invention with reference to the accompanying drawings.

Figures 1, 2:
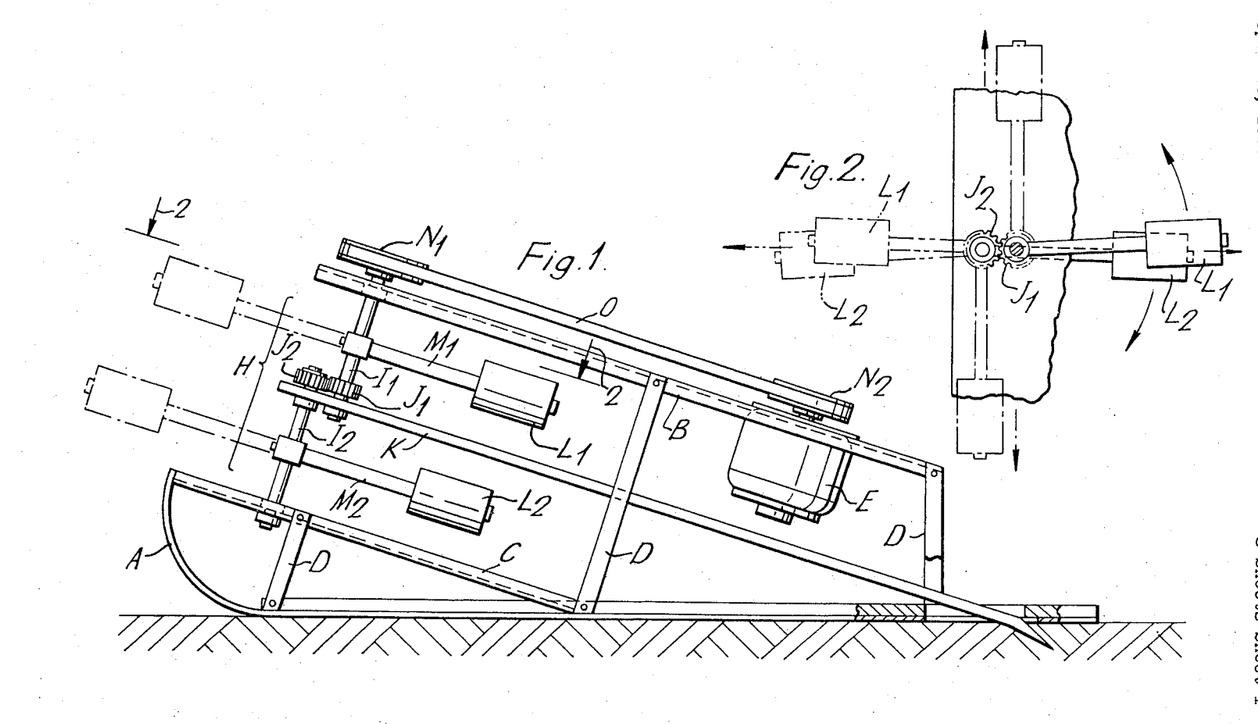
FIGURE 1 is a side elevation of an elementary propulsion unit in somewhat schematic form.
FIGURE 2 is a plan view of port only of FIGURE 1, in the direction of the arrow heads 2 of FIGURE 1.

Reference is first made to FIGURES 1 and 2 which show a device which is useful in assisting the understanding of the operation of the means for producing alternating thrusts incorporated in other embodiments of the invention. It is to be understood, however, that in these embodiments any other convenient means for generating the alternating thrusts may be used.

The device of FIGURE 1 is somewhat sledge-like, as indicated by its flat base and its bowed front A. The structure includes parallel pairs of plates having side-flanges B and C (of which one only is visible), so as to facilitate assembly by struts D. The said plates provide mountings for a driving motor E and a thrust-producing assembly H comprising a single thrust unit. The thrust unit comprises two parallel rotary shafts $I_1$, $I_2$, coupled directly by similar gear wheels $J_1$, $J_2$, such that in operation both shafts rotate at the same speed though in opposite directions of rotation, the adjacent ends of the two shafts being rotatably mounted in one end of a plate K, the other end of which has a wedge-like extension which resists backward slip between the soil and the device.

Each shaft $I_1$, $I_2$, carries a weight ($L_1$, $L_2$ respectively of equal masses), secured to the shaft by a connecting means ($M_1$, $M_2$ respectively), and shaft $I_1$ is provided with a pulley $N_1$ which is coupled by a driving belt O to a pulley $N_2$, so that shaft $I_1$ (and therefore also shaft $I_2$) may be driven by the motor E. When the shafts are driven thrust is derived from the action of the weights. The weights are so arranged relative to their respective shafts that in operation weight $L_1$ passes weight $L_2$ when their connecting rods are substantially in line with the intended direction of movement of the device. FIGURE 2 shows in full lines the two weights in the position existing soon after weight $L_1$ has passed weight $L_2$, in the backward direction of thrust, and, in broken lines, in the position existing shortly before weight $L_1$ is due to pass over weight $L_2$ in the forward direction of thrust.

It will be obvious that at the two instants in time (within one complete revolution of the weights) at which weights $L_1$ is nearest to $L_2$, the direction of thrust is in line with the intended direction of movement, or makes a pre-determined angle in a vertical plane with the intended direction of movement. It will also be obvious that the forward and rearward components of centrifugal force attributable to the two weights are additive in relation to what may be called the half-cycle of forward thrust and the half-cycle of backward thrust respectively, and that the sideways components of thrust substantially cancel out and have little or no effect on the movement of the device.

It will be seen that in FIGURE 1 the thrust unit as a whole is inclined at a fairly small angle to the horizontal, being higher at the front end of the device and lower towards the rear end. Thus, during the half-cycle of forward thrust, the device tends to move forward and to rise simultaneously and also during the half-cycle of backward thrust the device tends to move backward and downwards simultaneously, so that the plate K tends to dig into the ground to stop the device from moving backwards. Forward and backward thrusts are alternately transmitted to the device via the shafts $I_1$, $I_2$. The angle of inclination of the plane of thrust, which in the figure is shown to be fairly small, may be made to vary depending on the anticipated conditions of operation of the device.

The device outlined so far suffers from the major disadvantage that the movement is periodic. In consequence, to obtain substantial forward movement the forward thrust needs to be large in relation to the inertia of the device while to prevent backward slip the weight of the device needs to be large in relation to the backward thrust as resistance to backward thrust tends to be a function of the vertical reaction between the device and the soil.

Figure 3:
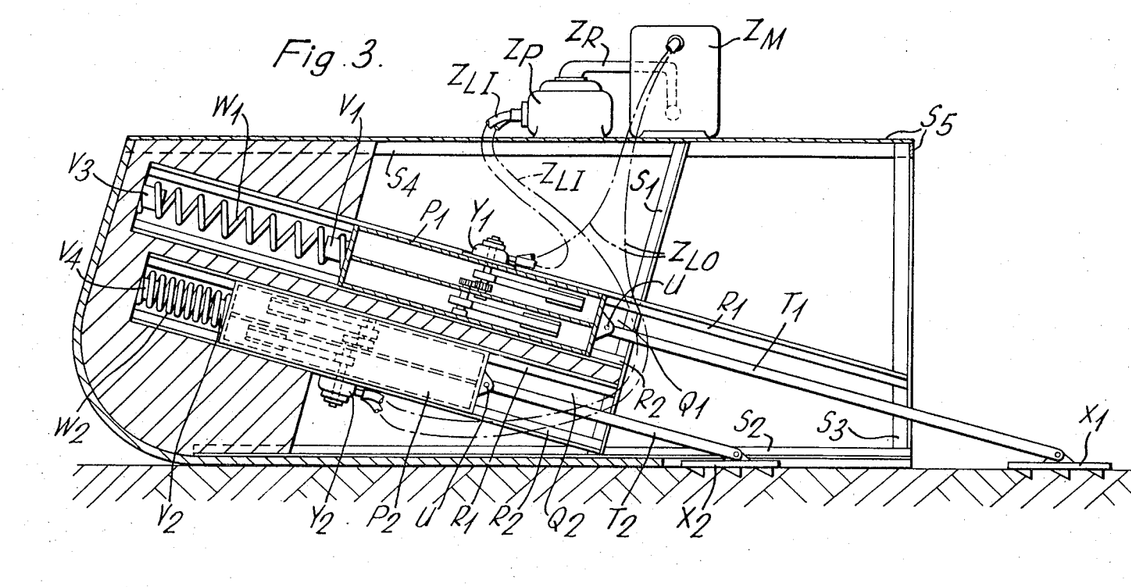
FIGURE 3 is a side elevation, partly in section, of a vehicle the embodying the present invention.
Figure 4:
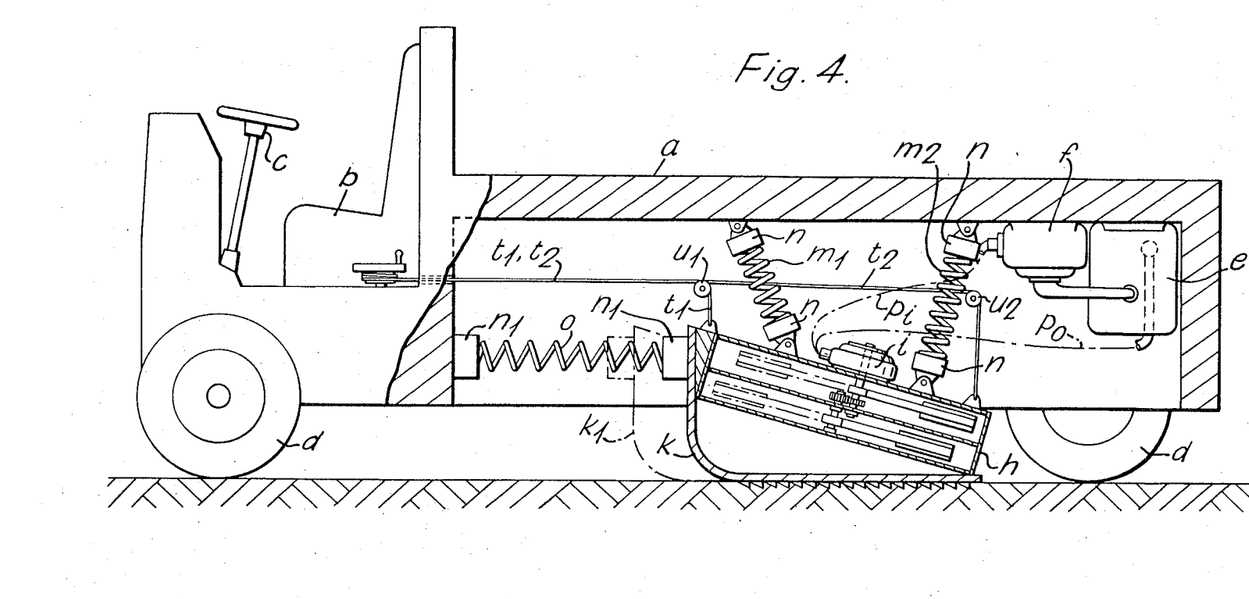
FIGURE 4 is a side elevation, partly in section, of an alternative form of vehicle embodying the present invention.

FIGURES 3 and 4 illustrate vehicles in accordance with my invention which overcome this difficulty; a principal member of the vehicle being capable of uniform motion and another member (containing the propulsion unit) capable of periodic motion in the same direction.

The device of FIGURE 3 is a load-carrying vehicle in somewhat sledge-like form. In this vehicle two thrust units, $P_1$, $P_2$, are used (although a single thrust unit could be used if desired). $P_1$ and $P_2$ are each slidable in a guide-way ($Q_1$, $Q_2$ respectively) defined by pairs of parallel plates, each having a comparatively shallow flange $R_1$, $R_2$ to prevent any tendency of either thrust unit to deviate from a desired to-and-fro path. Only the remote pair of plates defining each guide-way is shown, it being understood that a similar but opposing pair of plates, not shown, is employed to complete the defining of the respective guide-way. Various supporting struts are shown at $S_1$, $S_2$, $S_3$, etc., assembled in any convenient conventional manner. Struts such as $S_1$ may be extended to constitute stops for limiting backward movement of the thrust units if necessary, without restricting pivotal movement about U of rods $T_1$, $T_2$, rotatably attached to the casings of the thrust units as indicated at U in each case. Helical compression springs $W_1$ and $W_2$ are employed between the thrust units and the front ends of the guide-ways, being located by studs $V_1$-$V_4$. Each spring must be at least partly compressed when the vehicle is in used.

At the outer ends of rods $T_1$, $T_2$ are toothed plates $X_1$, $X_2$, pivotally attached. These plates constitute "backward movement resisting" attachments, having teeth shaped as shown to resist backward motion of the thrust units without resisting forward motion to any great extent. The springs are inclined to the horizontal and in line with the thrust unit as shown so as to transmit a driving force from the thrust units to the vehicle and to utilise the weight of the vehicle to apply a substantial downward thrust to the thrust units without substantially increasing their inertia.

Each thrust unit is driven separately from the other by its own hydraulic motor $Y_1$, $Y_2$, driven by a hydraulic pump $Z_P$ and prime mover $Z_M$ via flexible pipelines $Z_{L1}$. Springs $W_1$, $W_2$ assist in converting the periodic motion of the thrust units into a uniform motion of the vehicle. The component of thrusts of the springs normal to the soil also assist the plates $X_1$, $X_2$, to resist backward motion of the thrust generating units. Any convenient number of thrust generating units combined with their respective "backward movement resisting plates" may be employed.

In operation the overall weight of the vehicle combined with its load is substantially greater than the weight of an individual thrust unit.

The vehicle of FIGURE 4 is made up of a wheeled load-carrying platform $a$, a driving seat $b$, a steering wheel and column assembly $c$, wheels $d$, a prime mover $e$, a hydraulic pump $f$, pipe-lines $P_0$, $P_1$, a sledge-like supporting frame $k$ for the thrust unit $h$, and a hydraulic motor $i$ partially-compressed springs $m_1$, $m_2$, interconnecting the thrust unit and the platform, the spring $o$ being located between end-cups $n$ as shown, a horizontal partially-compressed spring $o$ also located in end-cups, interconnecting the thrust unit frame and the platform $a$. The frame $k$ is provided on its ground-engaging surface with teeth shaped as shown so as to improve resistance to backward movement whilst the thrust unit is exerting backward thrust and so as to tend to ride easily in the forward direction while the thrust unit is exerting forward thrust.

If desired the vehicle may include a mechanism for raising and lowering the thrust unit so that the vehicle may be driven solely via its wheels. The particular mechanism illustrated consists of a wheel for pulling wire ropes $t_1$, $t_2$ over pulleys $u_1$, $u_2$, the ropes being hitched to lugs on the thrust unit casing as shown. The vertical springs enable the weight of the wheeled platform $a$ to apply to the thrust unit assembly a substantial downward thrust additional to the weight of the thrust unit without increasing is inertia significantly. In this vehicle also the thrust unit assembly should be of much smaller weight than the wheeled platform $a$ plus load. The vertical springs also assist the teeth on the base of the thrust unit assembly to oppose backward motion of that assembly.

Figure 5:
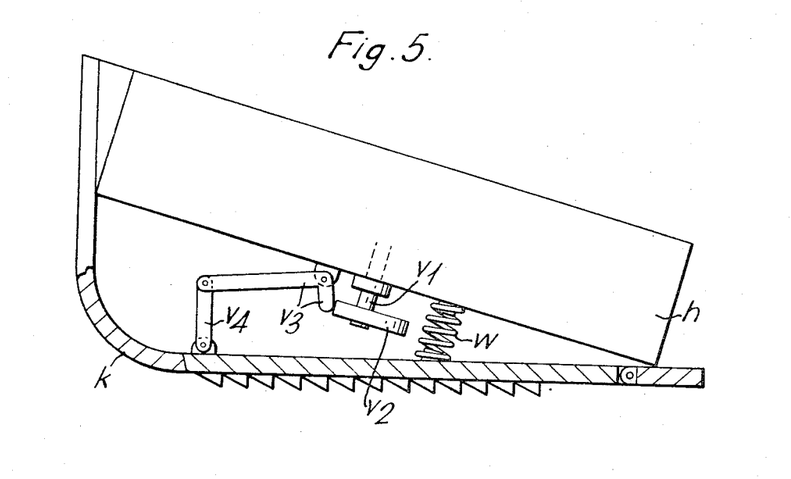
FIGURE 5 is a side elevation of the propulsion unit of FIGURE 4, showing modifications of detail.
Figure 6:
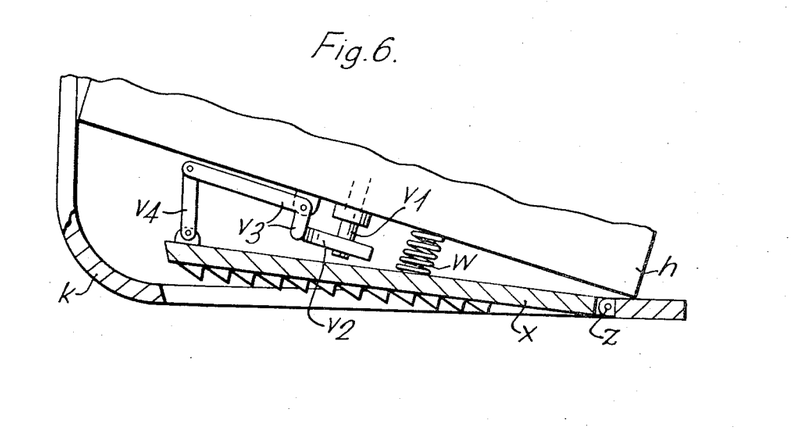
FIGURE 6 is a view showing the parts of FIGURE 5 in an alternative position.

FIGURES 5 and 6 show detailed modifications possible to the thrust unit assembly of FIGURE 4. In these figures a camshaft $v_1$ extends from the lower shaft of the thrust unit and carries a cam $v_2$ for actuating a bell-crank lever $v_3$, pivoted as shown to raise a link $v_4$ pivotally attached to the hinged toothed portion of the base of the frame $k$. A return spring $w$ causes the toothed base to dig into the ground during half-cycles of backward thrust and the cam $v_2$ lifts the hinged base during half-cycles of forward thrust.

Figure 7:
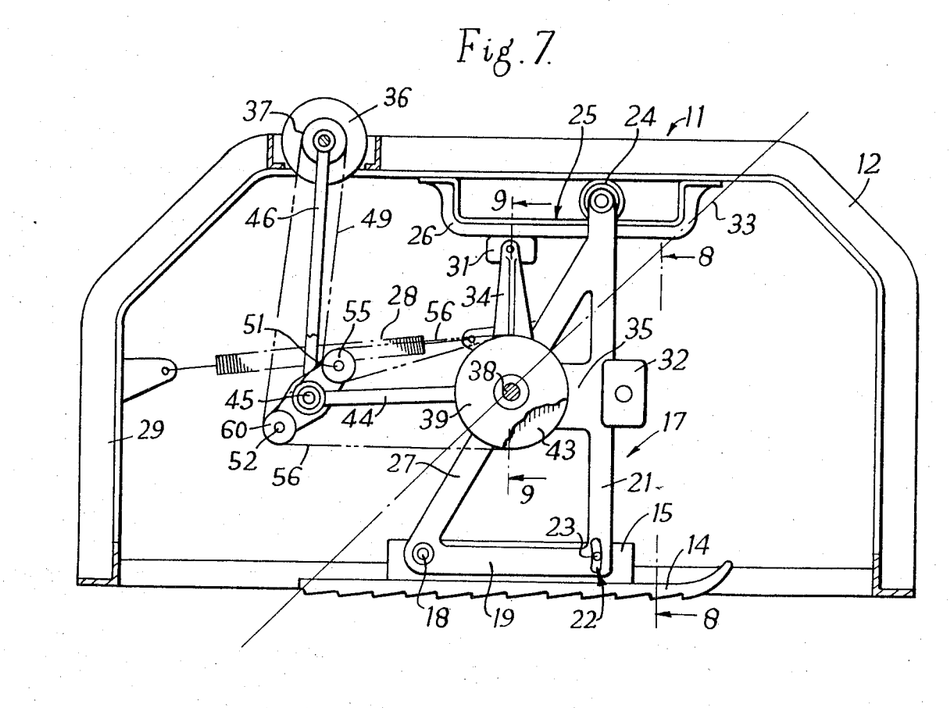
FIGURE 7 is a side view of a detail of a further embodiment of the invention.

Referring now to FIGURE 7 there is shown the propulsion unit 11 for a vehicle (not shown), of which only the main frame 12 is shown. The main frame 12 is of inverted U-shape. The vehicle has attached to the frame ground engaging means, such as wheels, skis or skids, to carry the weight of the vehicle.

The propulsion unit 11 comprises a drive ski 14 which has low resistance to forward movement over the ground and a high resistance to rearward movement relative to the ground. This is conveniently effected by providing the undersurface of the ski with serrations as shown and also, conveniently by coating the undersurface of the ski with a low friction material, such as polytetrafluoroethylene. The vertical edges of the serrations may be of metal to improve resistance to backward movement.

On its upper surface the ski 14 has a pair of longitudinally extending flanges 15 to the rear end of which one apex 16 of a pair of levers 17 of open triangular shape is pivoted by means of a pivot pin 18. One side 19 of the lever 17 lies alongside the flange 15 and near its end remote from apex 16 joins a vertical side 21. An arcuate slot 22 is formed in the lower end of side 21. A pin 23 carried by the flange 15 engages in the slot 22 which is so shaped that the lever 17 can pivot about the pivot pin 18 relative to the flange 15. The upper end of the vertical side 21 carries a cylindrical slider block 24 which is slidable within a horizontal guide path 25 formed by the undersurface of the frame 12 and an inverted U-shaped member 26 secured to the frame 12. The guide path 25 is of such dimensions that the slider block cannot make any substantial movement relative thereto in the vertical direction. The third side 27 of the lever 17 joins the vertical side 21 just below the member 26. A tension spring 28 extends between the lever 17 and the rear leg 29 of the frame 12.

Figure 8:
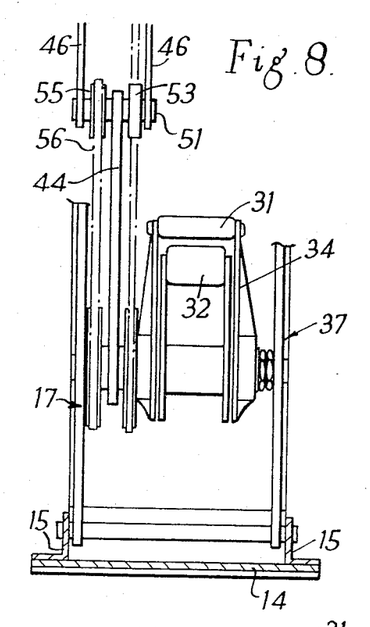
FIGURES 8 and 9 are detail sections to two different scales, the sections being taken on lines 8—8 and 9—9 of FIGURE 7 with the position of certain parts distorted to facilitate understanding of the construction of the embodiment.
Figure 9:
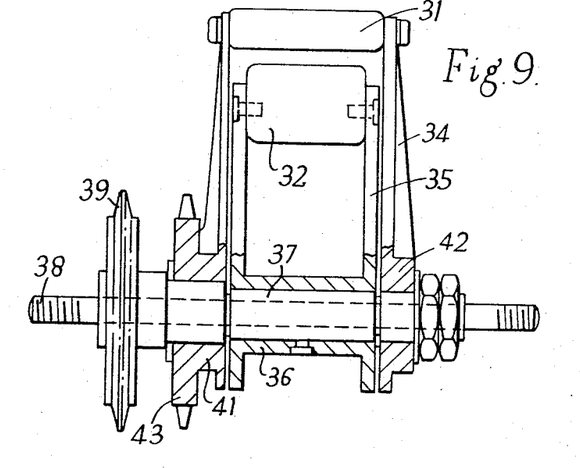

The ski assembly above described is moved by a thrust-generating unit. This thrust-generating unit comprises a pair of rotating weights 31 and 32 rotated in opposite directions as aforedescribed in parallel vertical planes and having their plane of coincidence indicated at 33 extending forwardly and upwardly. The weights 31 and 32 are of different mass and are mounted respectively upon pairs of arms 34 and 35 of different lengths so that the thrust exerted by ones mass 31 equals the thrust exerted by the other. The arms 34 and 35 are arranged so that mass 32 rotates within the circle of weight 31 and between the arms 34. However, if desired, equal weights on arms of equal length may be employed. The arms 35 are connected to the ends of a collar 36 which is keyed to a bushing 37 rotatably mounted on axle 38. At one end, the bushing 37 carries a sprocket wheel 39.

The arms 34 are carried on two bearing members 41 and 42 rotatable about the bushing 37. A sprocket wheel 43 is integral with bearing member 41.

The axle 38 is carried at one end of a link 44, the other end of which is pivoted at 45 to one end of a pair of further links 46. This link 46 is mounted on the frame 12 to pivot about an axis coincident with the axis of a motor 47 also carried by this frame. The motor drives a sprocket wheel 48 over which passes a chain 49 that drivably engages the sprocket wheel 43. At 45 the links 44 and 46 carry a plate on which are mounted two stub shafts 51 and 52 that respectively carry idler sprockets (only one sprocket 53 is shown) over which the chain 49 passes. Stub shaft 51 which is rotatable with sprocket 53 fixedly carries another sprocket 55. A further chain 56 passes over sprockets 55 and 39 as well as a further sprocket 60 which is freely rotated about stub shaft 52. The chain 56 lies over a part of sprocket 55 opposite to the part of sprocket 53 engaged by chain 49 so that when the pin 51 rotates the chains 49 and 56 rotate in opposite directions and hence the arms 34 and 35 rotate in opposite directions.

The linkwork 44 and 46 also serves to ensure that chain is correctly tensioned even though the ski assembly moves relative to the frame 12. Tensioning sprockets may also be provided to tension the chains 49 and 56.

In use, when the weights 31 and 32 are rotating they produce an alternating force along the plane 33. When the thrust has a forward and upward component, this tends to lift the ski 14. It also moves the ski and its lever 17 translationally relative to the frame 12. This is facilitated because the ski 14 has a low resistance to movement forwardly as well as being lifted slightly off the ground. When the thrust has a rearward and downward component, the ski 14 is forced downwardly into the ground accentuating its high resistance to rearward movement over the ground. Except in unusual circumstances the skill will not move backwardly and will subsequently progress forward, in the manner described above, from the position in which it has engaged the ground as aforesaid. When the tension in the spring 28 is greater than the resistance to the movement of the vehicle, the spring pulls the vehicle along in the forward direction. Thereafter the spring 28 acts to smooth out the forces applied by the ski assembly.

Any other thrust-generating device may be used if desired and a second ski assembly may be incorporated in the unit so as to provide a smoother drive.

Figure 10:
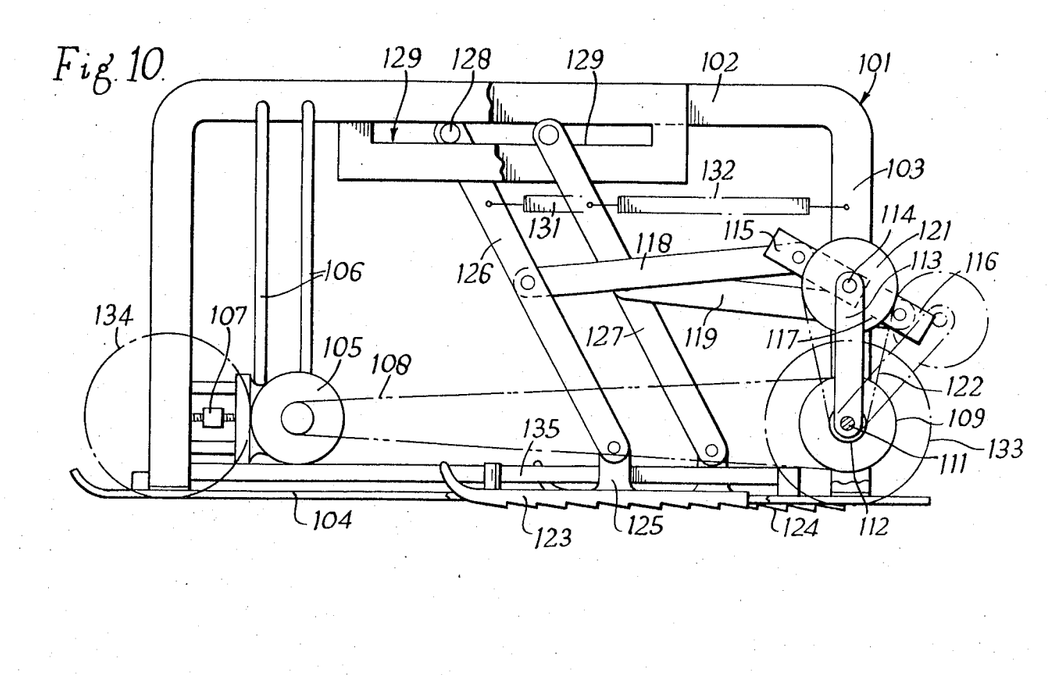
FIGURE 10 is a side view partially in section of a further vehicle which embodies my invention and which incorporates my currently preferred embodiment of my invention.

Referring now to FIGURE 10, another vehicle of the invention comprises a frame 101 having a horizontal rectangular main section 102 from the corners of which depend supports 103. These supports 103 respectively carry at their ends ground engaging means in the form of a pair of parallel skis 104 for supporting the vehicle upon snow-covered ground. It is to be appreciated, however, that the supports 103 may carry wheels, preferably having inflatable tyres, or the supports 103 may terminate on bogies and may be steerable.

Pivotally slung beneath the forward part of the main section 102 of the frame is a power means in the form of an internal combustion engine 105. This engine 105 is carried by pivoted levers 106 and is adjusted in position by an adjustable link 107. The engine 105 drives a chain 108 which in turn drives a sprocket wheel 109 carried to rotate a shaft 111 extending across the rear supports 103. Also carried by the shaft 111 is a pulley 112 and a pair of levers 113. At their free ends the levers 113 rotatably carry stub shafts 114 upon which are keyed crank members 115 and 116. A central crank member 117 extends between and parallel to these crank members 115 and 116. A first lever 118 is pivoted between the free end of crank member 115 and the adjacent end of central member 117. A second lever 119 is pivoted between the free end of crank member 116 and the other end of central member 117. A pulley 121 is also keyed to one of the stub shafts 114. A belt 122 extends between pulleys 112 and 121 so that upon rotation of the engine 105 the crank members rotate and the levers 118 and 119 are caused to oscillate.

Located side-by-side below the main section 102 and between the skis 104 are first and second drive skis 123 and 124. These skis 123 and 124 have serrations on their undersides so that when the skis 123 and 124 tend to move rearwardly relative to the frame 101, the skis engage the ground so that there is a very high coefficient of friction between the skis and the ground. The forward resistance of the skis, however, is low and the undersurface of the skis may be coated with polytetrafluoroethylene for improved characteristics when the vehicle is being used on snow.

Each of skis 123 and 124 has a central boss 125 whereby the first and second skis 123 and 124 may be pivotally connected respectively to the lower ends of first and second carrying levers 126 and 127 respectively. At their upper ends the levers 126 and 127 carry slider blocks 128 which are respectively slidable in two horizontal guide paths 129 formed on the underside of portion 102 of the frame 101. The free ends of the first and second links 118 and 119 (the other ends of which are connected to the crank as aforedescribed) are pivotally connected to the first and second levers 126 and 127 respectively. The links are connected to the levers nearer the slider block ends thereof and may even be connected to the said levers at the same location as the slide blocks.

Elongated springs 131 and 132 extend respectively between the levers 126 and 127 and the frame 101. These springs may be connected to the levers at any position in their length but I prefer them to be connected above the connection between the lever and its moving link as shown or at the guide blocks. The springs may slope downwardly and rearwardly to apply a downward and rearward force to the skis.

In operation, on rotation of the shaft 114 and the crank members, one of the links, say for convenience link 118, is moved forwardly relative to the frame, i.e. towards the engine. The initial effect of such movement is to cause the lever 126 to pivot forwardly about its connection with the lug 125 of ski 123. As the guide block 128 is prevented from moving downwardly by guide path 129, the ski 123 is lifted slightly off the ground. Thereafter the lever 126 is caused to effect translational movement relative to the frame 101 with the guide block 128 sliding in the guide path 129 and the lever 126 maintaining a substantially constant inclination to the main section 102 of the frame. The ski 123 is thus moved forwardly relative to the frame 101. Also the spring 131 is extended.

While the link 118 is being moved forwardly, the link 119 is being moved rearwardly relative to the frame. The initial effect of such movement is to cause the lever 127 to pivot rearwardly about its connection with the lug 125 of ski 124. As the guide block 128 is prevented from moving upwardly by the weight of the frame acting upon the upper surface of the guide path 129, the ski 124 is urged downwardly into the ground. The ski 124 has a high resistance to movement in the rearward direction. This is increased by the downward force applied to the ski 124 as described above. The ski 124 will therefore not move rearwardly over the ground except under most unusual circumstances. Thus the central shaft 114 of the crank mechanism will be moved forwardly. This will in turn increase the forward movement of the ski 123 as described above.

On further rotation of the crank mechanism past its position of maximum throw, the link 118 will be moved rearwardly and the lever 119 forwardly relative to the frame 101. The action of the ski units are now reversed with the ski 123 being inhibited against rearward movement relative to the ground and the ski 124 being moved forwardly relative to the frame. When the skis 123 and 124 have moved an appropriate distance relative to the frame 101, the springs 131 and 132 are so stretched that one or both apply forces to the frame sufficient to overcome the frictional resistance to movement of the vehicle. The springs 131 and 132 now move the vehicle forwardly. The links 113 will be moved to an appropriate mean operating position such as that shown in FIGURE 10. The springs 131 and 132 now act to absorb any large fluctuations in forces exerted by the skis so that the vehicle is propelled with a substantially constant force.

It will be noted that during the rearward stroke of each lever 118 or 119, the force which is applied to its associated ski has a component in the rearward direction and a component in the downward direction caused by the weight of the vehicle 101 being utilised to increase the vertical reaction of the ski to the ground. During the forward movement of each lever the force which is applied to the associated ski has a component in the forward direction but the weight of the vehicle does not add in any way to the vehicle reaction.

Figure 11:
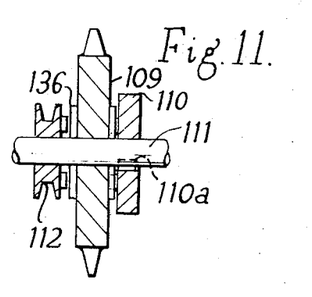
FIGURE 11 is a section on line 11—11 of FIGURE 10.

As mentioned above, the vehicle may have wheels (indicated in chain lines at 133 and 134) instead of skis 104. In these circumstances the rear wheels 133 may be mounted upon the shaft 111. A clutch device may be provided to selectively connect the sprocket 109 to the pulley 112 or to the shaft 114. A typical clutch device is shown in FIGURE 11. In this device the sprocket wheel 109 is freely rotatable on shaft 111 and is capable of limited axial movement under the influence of a clutch member (not shown). The sprocket wheel is located between a disc member 110 connected by key 110a to the shaft 111a and the pulley 112 is freely rotated about the shaft 111. The side faces of the sprocket wheel 109 has dogs 136 thereon to engage selectively dogs formed on the pulley 112 and the disc member 110. Thus by altering the axial location of the sprocket 109 the engine 105 may be connected either to rotate the wheels 133 or to cause the skis 123 and 124 to move as aforedescribed. When the wheels 133 are being used to provide motive power the skis 123 and 124 are lifted clear of the ground and are held for example by movable pins (not shown) upon a member 135 extending longitudinally of the frame between the skis 123 and 124. The movable pins may be carried either by the skis themselves or by the member 135.

Figure 12:
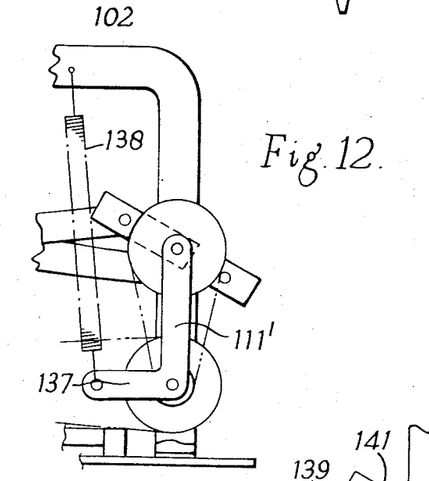
FIGURE 12 is a scrap view of a modification to the embodiment of FIGURE 10.

In a modification (see FIGURE 12) the links 111' have projecting arms 137 at their lower ends, which arms 137 extend at right angles to the links towards the engine 105 so that the links 111' take in effect the form of bell crank levers. In this modification the springs 131 and 132 are omitted. The resilient connection between the ski units and the frame is now through springs 138 extending from the free ends of the aforesaid arms to the underside of the frame 101. The springs 138 may be slidably connected to the arms 137 so that the spring bias can be adjusted by moving its point of connection with the arms 137.

As a further modification (not illustrated) a flexible member may extend between the links 126 and 127 at an appropriate position and a single spring may extend between the centre point of the flexible member and the frame. In both of these modifications, the springs would have to expand less than the springs 131 and 132. In the latter modification also the spring will only expand and contract upon variation of the distance of the centre point of the flexible member of the frame.

The power means 105 may be located at any other convenient position, for example on the rear end of the frame. The power means may be comprised by an electric motor or any other suitable source.

Figure 13:
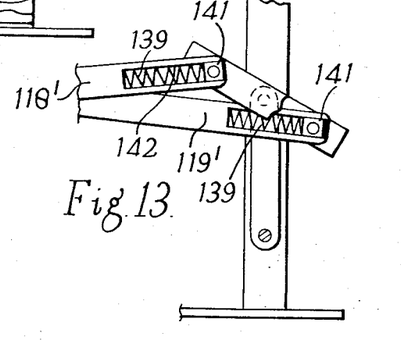
FIGURE 13 is a view similar to FIGURE 12 of another modification to the embodiment of FIGURE 10.

In another modification the crank arms are connected to the drive links 118' and 119' through compression springs 139 (see FIGURE 13). These springs 139 are conveniently contained within the links 118' and 119' and have their free ends connected to guide blocks 141 slidable within guideways 142 formed in these links. The crank arms are connected respectively to these guide blocks. If forward resistance to the movement of the respective skis is high, i.e. if the spring connecting a respective lever to the load carrier is already substantially tensioned while the ski is still being pushed forward, then the spring joining the connecting rod will compress and thus effectively shorten the throw of the eccentric. In consequence the average speed of the vehicle will be reduced as forward resistance increases.

A chain and sprocket arrangement can replace the pulley and belt system 112, 122, 121.

It will be noted that in the vehicles above described and illustrated the skis and associated members may be quite light and therefore easy to move. However, due to the downward force applied to the skis by the frame during the rearward movement thereof the contact forces and hence the coefficient of friction between the skis and the ground is increased to a considerable extent. Also it will be noted that the lift applied to the skis on forward movement will emphasize the low resistance to movement of the skis in this direction.

The vehicle thus provides a traction means in the form of the skis having a large area of contact with the ground but which is light to move and economical to produce. The vehicle is eminently suitable for travelling on snow-covered ground.

It will be appreciated that a number of modifications can be made to the various described embodiments of the invention as will be apparent to a person skilled in this art without departing from the spirit and scope of my invention.

I claim:
1. A vehicle comprising
 (i) a frame incorporating horizontal guide means,
 (ii) ground engaging means carrying the frame upon the ground,
 (iii) a first ski and a second ski, both of which said skis have a high resistance to movement in one direction and a low resistance to movement in the opposite direction,
 (iv) a first lever pivoted at one end to the first ski and carrying means at the other end slidable within the said horizontal guide means,
 (v) a second lever pivoted at one end to the second ski and carrying means at the other end slidable within the said horizontal guide means,
 (vi) crank means carried by the frame and rotatable about a central pivot axis,
 (vii) first and second links connecting the ends of the crank means respectively to the first and second levers so that upon rotation of the crank means the said links will tend to move the levers and skis relative to the frame, and
 (viii) power means for rotating the crank means.

2. A vehicle as claimed in claim 1 further comprising crank carrying means carrying pin means about which the crank is rotatable, the said crank carrying means being movably mounted relative to the frame.

3. A vehicle as claimed in claim 2 further comprising spring means extending between the levers and the frame.

4. A vehicle as claimed in claim 2 further comprising spring means acting between the crank carrying means and the frame.

5. A vehicle as claimed in claim 4 in which the crank carrying means comprises at least one bell brank lever having two arms inclined to one another, being connected respectively to the crank means and the spring means and being pivotally mounted intermediate the aforesaid connections.

6. A vehicle as claimed in claim 1 wherein the undersurface of each ski is serrated, the surface of the said serrated undersurface being comprised by polytetrafluoroethylene.

7. A vehicle as claimed in claim 1 further comprising spring means connected respectively between the crank means and the links.

8. A vehicle capable of moving along a land surface comprising
(i) a frame in contact with the ground and movable in at least a preferred direction along the ground,
(ii) a thrust unit comprising at least one pair of weighted members, each member being rotatable in opposite directions in a plane and being alignable in rotation to provide maximum thrust in said preferred direction, said planes being inclined with respect to the frame such that, during travel over a horizontal land surface, the plane is disposed at an angle to said horizontal surface, the angle extending upwards toward the said preferred direction of travel and downwards opposite said preferred direction,
(iii) means to retain said thrust members in said plane during rotation thereof to thereby apply to said thrust unit a substantial downward thrust in addition to the weight of the rotating member without substantially increasing the inertia of the thrust unit,
(iv) means to rotate said weighted members,
(v) means to restrain motion of the vehicle in a direction opposite to said preferred direction, and
(vi) means to permit thrust in said preferred direction from said thrust unit to be transmitted to said frame to move said frame from along a land surface, said thrust members being of substantially less weight than the remainder of the vehicle.

9. A vehicle according to claim 8 wherein said thrust unit is retractable.

10. A vehicle according to claim 8 wherein said means to retain the thrust members in said planes comprises spring means acting downwardly on said thrust member.

11. A vehicle according to claim 8 wherein said means to retain said thrust member in said plane comprises guideway means defining a path in which said rotating thrust members are slidable.

12. A vehicle according to claim 11 wherein said means to retain said thrust member in said plane further comprises spring means acting downwardly on said thrust member.

References Cited

UNITED STATES PATENTS

| 1,023,965 | 4/1912 | Reichenstein | 180—4 |
| 1,356,964 | 10/1920 | Castella | 180—8 |
| 1,511,960 | 10/1924 | Goldschmidt | 180—7 |

FOREIGN PATENTS 503,306  3/1920  France.

LEO FRIAGLIA, *Primary Examiner.*